C. H. OAKLEY.
METHOD OF AND APPARATUS FOR MAKING SHOES.
APPLICATION FILED SEPT. 5, 1918.

1,365,267. Patented Jan. 11, 1921.

Clifford H. Oakley, Inventor,
By his Attorneys,
Emery, Booth, Janney & Varney.

UNITED STATES PATENT OFFICE.

CLIFFORD H. OAKLEY, OF TRENTON, NEW JERSEY.

METHOD OF AND APPARATUS FOR MAKING SHOES.

1,365,267.   Specification of Letters Patent.   Patented Jan. 11, 1921.

Application filed September 5, 1918. Serial No. 252,678.

*To all whom it may concern:*

Be it known that I, CLIFFORD H. OAKLEY, a citizen of the United States, and a resident of Trenton, in the county of Mercer and State of New Jersey, have invented an Improvement in Methods of and Apparatus for Making Shoes, of which the following is a specification.

This invention relates to method of and apparatus for making shoes.

The principal object of the invention is the production of improved rubber-soled shoes, such as are used for bathing shoes or hospital slippers. Other objects will be in part obvious and in part pointed out hereinafter.

Heretofore in the manufacture of hospital slippers fitted with rubber soles it has been customary, according to one method, to stitch the sole to the upper and to the inner sole, making use of a glue or paste to cause adhesion between the lining and the outside upper material. In subjecting the slipper to the usual sterilizing process, that is, inclosing it in a steam chamber, the glue or paste becomes loosened and the slipper or shoe is damaged. According to another method heretofore in use, a so-called cemented slipper or shoe is made in similar manner to the method of manufacture of rubber boots and shoes. This process, however, has several disadvantages, one being that the vulcanizing process requires the sole composition to be quite heavy or excessively expensive out of all proportion to the use or service demanded of such an article of footwear. The manufacture of these cemented slippers or shoes has also required expensive equipment such as heating chambers, large quantities of lasts, and highly skilled workers.

According to the present invention, a light-weight pre-vulcanized rubber soled shoe of any desired quality, color or consistency, is produced with a minimum of equipment and expense, by comparatively unskilled labor, and the completed article can be repeatedly sterilized without material deterioration.

Figure 1:
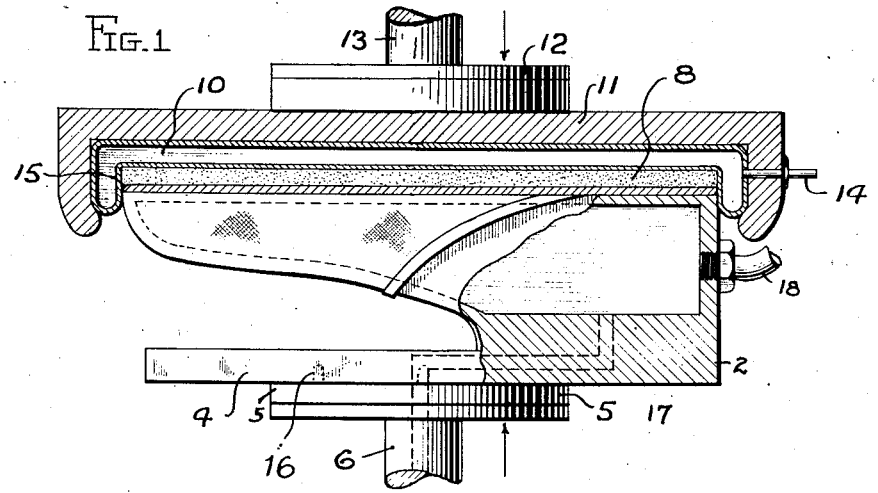
Figure 2:
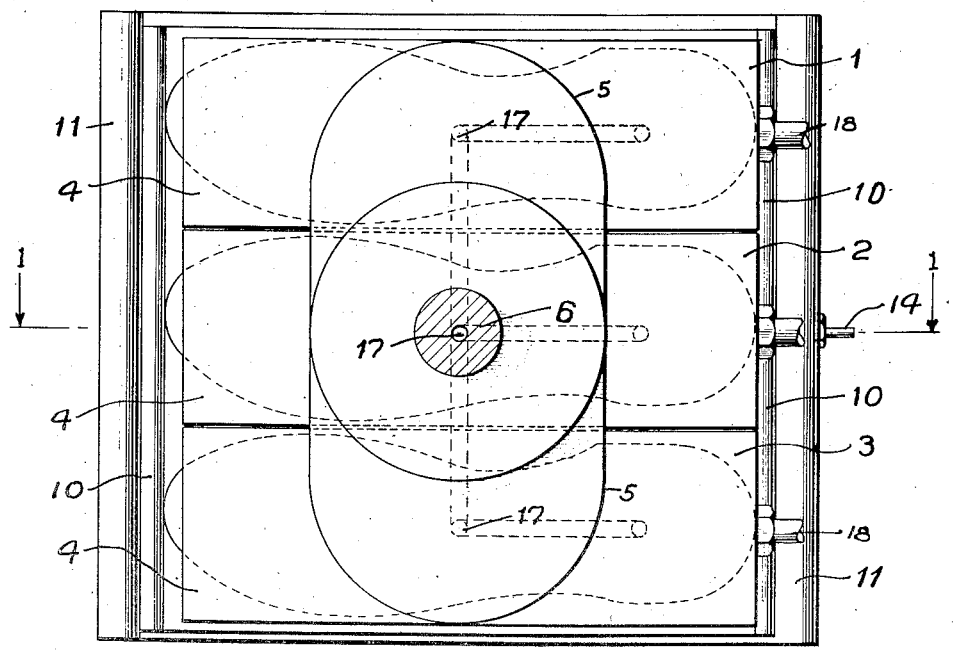

In the accompanying drawings, in which is illustrated a preferred form of shoe, and a preferred form of apparatus for making the same, Figure 1 is an elevation partly in section on line 1—1 of Fig. 2, and Fig. 2 is a bottom view.

Similar reference characters indicate corresponding parts in both views of the drawings.

In general, the shoe comprises upper stock of one or two plies of suitable upper material. If two plies are used, the plies are doubled or united to a lining material with a suitable moisture-resisting adhesive material or vulcanized rubber coating. This may be produced by frictioning one side of each of two pieces of material, one the outside of the upper and the other the lining, and then putting the two pieces together and preferably vulcanizing them. Upper stock cut from this material is then hemmed or bound around the top by sewing. The outer sole is made of rubber, preferably pre-vulcanized. The inner sole is of suitable cotton, wool or rubber composition composed of rubber and any suitable filler or fiber. The sole is stamped out of sheet or molded to size, as may be preferred. One side of the inner sole is cemented with a vulcanizing cement. The upper, inner sole and outer sole are united to one another in the manner hereinafter described.

I provide a hollow metallic last arranged preferably so that a number of the lasts can be manipulated by a single operation. After the upper, inner sole and outer sole have been brought together, the last is forced against a cushion frame. Steam is then admitted to the interior of the last, and by shaping the cushion of the frame in such a manner that it covers the outer surface and sides of the outer sole and even part of the upper, the heat of the steam is confined and efficiently effects vulcanization.

Referring to the accompanying drawings, there is illustrated a set of hollow metallic lasts 1, 2, 3, each having its lower portion 4 mounted on a cross-head 5 which in turn is connected, as by the plunger 6, to one element of a press, not shown. Bearing against the outer surface of each of the outer soles 8 is a cushion 10, mounted in a channel plate or cushion frame 11. The several frames are connected to a cross-head 12 similar to the cross-head 5, and connected as by the plunger 13, to the coöperating element of a press, not shown. The cushion 10 comprises preferably a water, steam and airproof bag, shaped to cover the soles of the shoes and a small portion of the uppers to such an extent that when steam is forced through the passages 17 in the plunger 6, cross-head 5, into the hollow lasts 1, 2, 3, the heat is sufficiently confined owing to the insulating character of the cushion to effect the vulcanization of the inner soles to the edges of the uppers as well as the vulcanization of inner soles and uppers to the pre-vulcanized outer soles. One or more valves 14 are provided so that compressed air can be forced into the cushions, if desired, and a conduit 18 may be utilized to carry off the exhaust steam.

The edges of the outer sole may be molded with thin, upwardly extended lips 15 in case it is desirable to have a portion of the sole extend upward and become vulcanized to the upper material of the shoe, similar in appearance to the ordinary cemented shoe or slipper.

The operation with the apparatus described may be summarized as follows: The inner sole is placed on the last, with its cemented side up. The upper material is then applied to the last, and the bottom edges brought up around the inner sole and rolled down with a stitcher to the cemented surface thereof. The inner sole and the overlapping edges of the upper material are then coated with a vulcanizing cement, and a pre-vulcanized rubber sole, cemented on one side, is applied to the last and rolled down. The last is then removed from the making-stand or bench and mounted, preferably in sets, on the pins 16 on the cross-head 5. The cushion frame 11 and its cushion 10 are then lowered over the outer soles, the sides of the cushion extending far enough down the shoes to cover part of the uppers. Steam is then admitted to the interior of the lasts, and is kept there for whatever time is necessary to effect vulcanization, after which the steam is shut off, the cushion frame lifted, and the shoes removed.

There is thus produced, by an efficient and economical method and apparatus, an inexpensive slipper or shoe that can be repeatedly sterilized.

My invention is obviously not limited to the embodiment illustrated in the accompanying drawings.

I claim:

1. Apparatus for making slippers or shoes, comprising a set of hollow metallic lasts adapted to receive shoes having uppers, inner soles and outer soles cemented together with a vulcanizing cement, a cross-head having a steam passage therein and supporting said lasts, a channel plate having a cushion mounted thereon adapted to be brought against the outer surface of the outer sole to cover the same, and means for admitting steam through the cross-head to the interior of the lasts to vulcanize the slipper or shoe.

2. Apparatus for making slippers or shoes, comprising a set of hollow metallic lasts adapted to receive shoes having uppers, inner soles and outer soles cemented together with a vulcanizing cement; a cross-head having a steam passage therein and supporting said lasts, a channel plate having a cushion mounted thereon adapted to be brought against the outer surface of the outer sole to cover the same and to cover the adjacent portions of the upper stock, and means for admitting steam through the cross-head to the interior of the lasts to vulcanize the slipper or shoe; the cushion confining the heat of the steam to effect efficient vulcanization.

3. The method of making shoes by assembling on a hollow last an inner sole and an outer sole cemented together and an upper cemented to said inner and outer soles which includes the step of heating the last to transmit vulcanizing heat outwardly through the inner sole to the outer sole while the assembled parts are held together under pressure.

4. The method of making shoes by assembling on a heat transmitting last an inner sole of non-vulcanizable material and a rubber outer sole with portions of an upper interposed between portions of said inner and outer soles which includes the step of heating the last while said assembled parts are held together under pressure to produce vulcanization of the outer sole through and to the inner sole.

5. The method of making shoes by assembling on a heat transmitting last an inner sole, an outer sole and an upper having portions interposed between portions of said inner and outer soles which includes the step of transmitting heat through the inner sole to the inner side of the outer sole while pressing the outer sole against a sole conforming and heat insulating member.

In testimony whereof, I have signed my name to this specification this 3rd day of September, 1918.

CLIFFORD H. OAKLEY.